United States Patent
Tanaka et al.

(10) Patent No.: US 9,339,767 B2
(45) Date of Patent: May 17, 2016

(54) MEMBRANE CONTAINER USED IN DEHYDRATOR

(75) Inventors: Yukio Tanaka, Tokyo (JP); Shinya Tachibana, Tokyo (JP); Hiroyuki Osora, Tokyo (JP); Shinji Ogino, Tokyo (JP); Haruaki Hirayama, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 383 days.

(21) Appl. No.: 13/818,250

(22) PCT Filed: Sep. 1, 2011

(86) PCT No.: PCT/JP2011/069877
§ 371 (c)(1),
(2), (4) Date: Apr. 4, 2013

(87) PCT Pub. No.: WO2012/035986
PCT Pub. Date: Mar. 22, 2012

(65) Prior Publication Data
US 2013/0186818 A1    Jul. 25, 2013

(30) Foreign Application Priority Data
Sep. 17, 2010    (JP) ................. 2010-209228

(51) Int. Cl.
*B01D 63/00*    (2006.01)
*B01D 63/06*    (2006.01)
(Continued)

(52) U.S. Cl.
CPC .............. *B01D 63/00* (2013.01); *B01D 61/368* (2013.01); *B01D 63/066* (2013.01); *B01D 65/00* (2013.01); *B01D 2313/08* (2013.01); *B01D 2313/086* (2013.01); *B01D 2313/20* (2013.01)

(58) Field of Classification Search
CPC ....... C02F 1/44; C02F 1/448; B01D 2313/22; B01D 24/004; B01D 24/008; B01D 29/23; B01D 29/232; B01D 29/235; B01D 29/52; B01D 29/54; B01D 29/56; B01D 29/58; B01D 63/04; B01D 63/046; B01D 63/066; B01D 5/0012; B01D 5/0006; B01D 5/0052; B01D 5/0054; B01D 5/0059; B01D 5/005
USPC .............. 210/180, 184, 186, 321.72, 321.78, 210/321.79, 321.81, 321.87, 321.88, 323.2, 210/640, 644, 649, 650, 651
See application file for complete search history.

(56) References Cited

U.S. PATENT DOCUMENTS 4,038,190 A * 7/1977 Baudet et al. ............ 210/321.81
4,261,829 A * 4/1981 Spranger .................. 210/321.81
(Continued)

FOREIGN PATENT DOCUMENTS

JP    5-76594 U    10/1993
JP    2001-509074 A    7/2001
(Continued)

OTHER PUBLICATIONS

Notice of Allowance dated Jul. 4, 2014, issued in Corresponding Japanese Patent Application No. 2010-209228 with English Translation (6 pages).
(Continued)

*Primary Examiner* — David C Mellon
*Assistant Examiner* — Pranav Patel
(74) *Attorney, Agent, or Firm* — Westerman, Hattori, Daniels & Adrian, LLP

(57) ABSTRACT

A membrane container 6 has a casing 10 including a fluid inlet 14 and a fluid outlet 16 and a membrane container body 9 including a plurality of flow paths 11 which is arranged along the flow direction of the treated fluid and in parallel to one another. Each of the plurality of flow paths 11 includes a most upstream portion 11A which is connected to the fluid inlet 14, and a most downstream portion 11C which is connected to the fluid outlet 16. Return portions 15 and 17 configured to reverse the flow direction of the treated fluid are provided between the most upstream portion 11A and the most downstream portion 11C. After passing through the fluid inlet 14, the treated fluid flows from the most upstream portion 11A down to the most downstream portion 11C via the return portions 15 and the upper return portion 17.

4 Claims, 5 Drawing Sheets

(51) Int. Cl.
*B01D 61/36* (2006.01)
*B01D 65/00* (2006.01)

(56) References Cited

U.S. PATENT DOCUMENTS

| | | | | |
|---|---|---|---|---|
| 4,732,673 | A | * | 3/1988 | Dagard et al. ............... 210/247 |
| 5,288,308 | A | * | 2/1994 | Puri et al. ............................ 96/8 |
| 5,788,826 | A | | 8/1998 | Nyberg |
| 2002/0162455 | A1 | * | 11/2002 | Bikson et al. ....................... 96/8 |
| 2003/0121840 | A1 | * | 7/2003 | Pex et al. ...................... 210/185 |
| 2004/0149647 | A1 | * | 8/2004 | Hampton et al. ......... 210/497.01 |
| 2004/0211726 | A1 | * | 10/2004 | Baig et al. ..................... 210/640 |
| 2006/0011535 | A1 | * | 1/2006 | Ikeda et al. ............... 210/321.79 |
| 2009/0008341 | A1 | * | 1/2009 | Townson et al. ............. 210/767 |
| 2010/0116727 | A1 | | 5/2010 | Tachibana et al. |
| 2011/0024342 | A1 | * | 2/2011 | Fujita et al. .................. 210/184 |

FOREIGN PATENT DOCUMENTS

| | | | |
|---|---|---|---|
| JP | 2003-103151 A | | 4/2003 |
| JP | WO2009118934 | * | 1/2009 |
| JP | 2009-66503 A | | 4/2009 |
| JP | 2010-115596 A | | 5/2010 |
| JP | WO2011065467 | * | 3/2011 |

OTHER PUBLICATIONS

International Search Report for PCT/JP2011/069877, mailing date of Dec. 13, 2011.

Translation of the International Preliminary Report on Patentability (PCT/IB/338) (1 page), (PCT/IB/373) (1 page) of International Application No. PCT/JP2011/069877 mailed Apr. 25, 2013 (Form PCT/ISA/237) (3 pages).

* cited by examiner

FIG.5(a)
FIG.5(b)
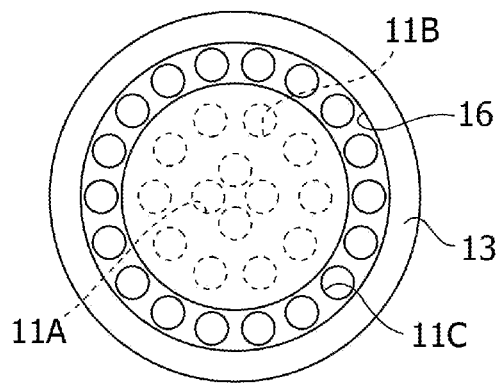
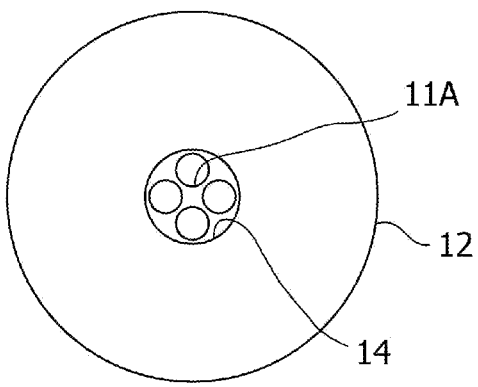
FIG.6
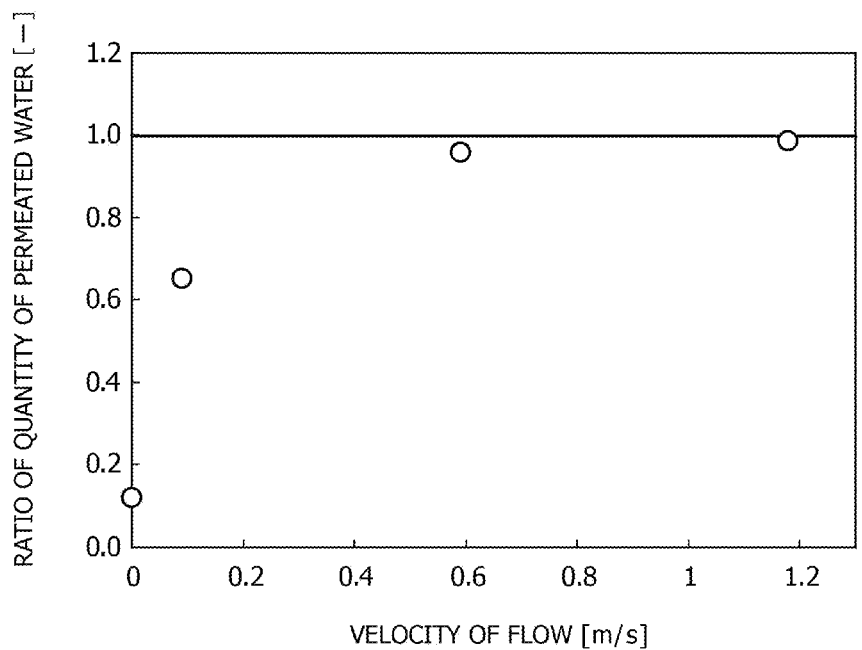

MEMBRANE CONTAINER USED IN DEHYDRATOR

TECHNICAL FIELD

The present invention relates to a dehydrator for dehydrating a mixture (treated fluid) of water with ethanol which forms an azeotropic composition with water. More specifically, the present invention relates to a membrane container included in a dehydrator having water separation membranes.

BACKGROUND ART

In recent years, ethanol has attracted attention as a fuel source alternative to petroleum fuels. However, for adopting ethanol as a fuel, it is necessary to purify, by distillation, a crude product obtained from a biomass such as corn, and then to perform dehydration until at least 99.5 wt % is reached.

Known conventional dehydration methods include a method for separating water from the treated fluid by the pervaporation method (penetrative vaporization (PV) method) using a water separation membrane (see, for example, Patent Literature 1). In the dehydrator discussed by Patent Literature 1, a plurality of columnar water separation membranes is arranged inside a shell part in series. Each water separation membrane is provided with a plurality of flow paths, each of which having a predetermined diameter. In the water separation membrane described above, the treated fluid simultaneously flows through all the flow paths at a predetermined velocity and water is separated from the treated fluid while the treated fluid flows through the flow paths.

CITATION LIST

Patent Literature

PTL 1: Japanese Patent Application Laid-Open No. 2010-115596
PTL 2: Japanese Patent Application Laid-Open No. 2003-103151

SUMMARY OF INVENTION

Technical Problem

Incidentally, it is conventionally known that the water separation performance may greatly vary according to the velocity of flow of treated fluid in the configuration that uses the above-described water separation membranes. This phenomenon will be described in detail below.

FIG. 6 illustrates a ratio of quantity of permeated water to the quantity of permeation of a matter (containing water and ethanol) that has permeated through water separation membranes. Referring to FIG. 6, the ratio of quantity of permeated water is about 1 at the velocity of flow of approximately 0.6 m/s. The ratio of quantity of permeated water to the quantity of a matter permeated through the water separation membranes becomes lower as the flow velocity of the treated fluid becomes lower. As described above, if water separation membranes are used and if the flow velocity of the treated fluid is low, the ratio of permeated water to the matter permeated through the water separation membranes becomes low. As a result, the water separation performance may degrade.

In addition, if the flow velocity of the treated fluid is low, the problem may arise such that concentration polarization may occur in the vicinity of the water separation membranes. The term "concentration polarization" refers to a phenomenon that may occur in the vicinity of water separation membranes, in which a dissolved matter (water in the example illustrated in FIG. 6) that does not permeate through water separation membranes produce a gradient of concentration in the direction perpendicular to the water separation membrane.

FIGS. 7A and 7B illustrate a case where the concentration polarization is produced and another case where the concentration polarization is not produced. More specifically, FIG. 7A illustrates a case where the flow velocity of the treated fluid is low. FIG. 7B illustrates a case where the flow velocity of the treated fluid is high. As illustrated in a chart (1) of FIG. 7A, if the flow velocity of the treated fluid is low, the concentration of water becomes lower as the distance to the water separation membrane becomes smaller while the concentration of water becomes higher as the distance to the water separation membrane in the direction perpendicular to the water separation membrane (in the direction of the cross section) becomes greater. As a result of such concentration polarization, referring to the change of the concentration of water in the direction of flow of the treated fluid illustrated in the chart (2) of FIG. 7A, the concentration of water hardly becomes low. Accordingly, it is known that the water separation performance is problematically low. On the other hand, as illustrated in the chart (1) of FIG. 7B, if the flow velocity of the treated fluid is sufficiently high, water permeates through the water separation membranes. Accordingly, no concentration polarization occurs. As a result, referring to the change of the concentration of water in the direction of flow of the treated fluid illustrated in the chart (2) of FIG. 7B, the concentration of water gradually becomes lower. Accordingly, it is known that a sufficiently high water separation performance is achieved.

For example, when a 200,000 t/year-ethanol treatment is considered, the following problems may arise for the conventional water separation membrane discussed by Patent Literature 1. In the conventional water separation membrane discussed by Patent Literature 1, the treated fluid is allowed to simultaneously flow through all the flow paths. Accordingly, the cross section of the flow path (i.e., the cross section in the direction perpendicular to the treated fluid) is large in relation to the flow rate of the treated fluid. Therefore, the flow velocity of the treated fluid cannot become high. As a result, a sufficiently high water separation performance cannot be achieved. As a matter of course, in carrying out a treatment of 200,000 t/year-ethanol or less, the water separation performance may become further lower because the flow velocity of the treated fluid further decreases. In other words, a problem such that the dehydrator cannot be scaled down due to the degraded water separation performance may arise. In addition, in order to increase the flow velocity of the treated fluid, the capacity of a pump may be increased. However, costs for the apparatus may increase in this case. Accordingly, it is necessary to take measures for increasing the velocity of flow without increasing the capacity of the pump.

The present invention is devised to solve the above-described problems. The object of the present invention is to provide a membrane container, which is used in a dehydrator and capable of increasing the velocity of flow of treated fluid and of achieving a sufficiently high water separation performance.

Solution to Problem

In order to solve the above-described problems arising in the conventional techniques, according to an aspect of the present invention, a membrane container includes a casing which includes a fluid inlet through which treated fluid flows in, and a fluid outlet from which the treated fluid flows out, and a membrane container body including a plurality of flow paths arranged along a flow direction of the treated fluid and in parallel to one another. In the membrane container, water is separated from the treated fluid while the treated fluid passes through the plurality of flow paths, the plurality of flow paths includes a most upstream portion connected to the fluid inlet, and a most downstream portion connected to the fluid outlet, a return portion for reversing the flow direction of the treated fluid is provided between the most upstream portion and the most downstream portion, and the treated fluid, after passing through the fluid inlet, is allowed to flow from the most upstream portion down to the most downstream portion via the return portion.

In addition, according to an aspect of the present invention, an intermediate portion in which the flow direction of the treated fluid is reversed by the return portion at least once is provided between the most upstream portion and the most downstream portion of the plurality of flow paths, and the treated fluid, after passing through the fluid inlet, is allowed to flow from the most upstream portion to the most downstream portion via the intermediate portion by successively passing through the most upstream portion, the intermediate portion, and the most downstream portion in this order.

In addition, according to an aspect of the present invention, the most upstream portion is arranged around the center axis of the membrane container body, the intermediate portion is arranged in an outer periphery of the most upstream portion, and the most downstream portion is arranged in an outer periphery of the intermediate portion.

Moreover, in the aspect of the present invention, it is more useful if an aggregate cross section of the most upstream portion in a direction perpendicular to the flow direction of the treated fluid, an aggregate of the cross section of the most downstream portion, and an aggregate of the cross section of a portion of the intermediate portion of the flow path, in which the treated fluid flows in the same direction and which is located n-th (n is an integer of 1 or greater) from the most upstream portion, are set the same as one another.

Advantageous Effects of Invention

According to an aspect of the present invention, a membrane container, which is used in the dehydrator of the present invention, includes a casing which includes a fluid inlet through which treated fluid flows in, and a fluid outlet from which the treated fluid flows out, and a membrane container body including a plurality of flow paths arranged along a flow direction of the treated fluid and in parallel to one another. In the membrane container, water is separated from the treated fluid while the treated fluid passes through the plurality of flow paths, the plurality of flow paths includes a most upstream portion connected to the fluid inlet, and a most downstream portion connected to the fluid outlet, a return portion for reversing the flow direction of the treated fluid is provided between the most upstream portion and the most downstream portion, and the treated fluid, after passing through the fluid inlet, is allowed to flow from the most upstream portion down to the most downstream portion via the return portion. In the conventional technique, a sufficiently high flow velocity cannot be achieved because the treated fluid simultaneously flows through all flow paths of the membrane container body and thus the cross section of the flow path (i.e., the cross section in the direction perpendicular to the flow direction of the treated fluid) is large in relation to the flow rate of the treated fluid. According to an aspect of the present invention, the cross section of the flow path is small in relation to the flow rate of the treated fluid because each of the plurality of flow paths is divided into a most upstream portion and a most downstream portion. Accordingly, a high flow velocity of the treated fluid that flows in the membrane container body can be achieved if a pump similar to that used in the conventional configuration is used. With the above-described configuration, no concentration polarization may occur in the membrane container body. Accordingly, a sufficiently high water separation performance can be secured. In addition, in an aspect of the present invention, because the treated fluid can flow in the membrane container body at a sufficiently high flow velocity, the dehydrator can be readily scaled down without degrading the water separation performance.

In addition, according to an aspect of the present invention, in the membrane container used in the dehydrator of the present invention, an intermediate portion in which the flow direction of the treated fluid is reversed by the return portion at least once is provided between the most upstream portion and the most downstream portion of the plurality of flow paths, and the treated fluid, after passing through the fluid inlet, is allowed to flow from the most upstream portion to the most downstream portion via the intermediate portion by successively passing through the most upstream portion, the intermediate portion, and the most downstream portion in this order. Accordingly, the cross section of the flow path is small in relation to the flow rate of the treated fluid. As a result, the flow velocity of the treated fluid that flows in the membrane container body can be further increased. Accordingly, the present invention can more efficiently prevent concentration polarization. Therefore, a sufficiently high water separation performance can be secured.

Furthermore, according to an aspect of the present invention, in the membrane container used in the dehydrator of the present invention, the most upstream portion is arranged around the center axis of the membrane container body, the intermediate portion is arranged in an outer periphery of the most upstream portion, and the most downstream portion is arranged in an outer periphery of the intermediate portion. Accordingly, the membrane container is configured so that the treated fluid is allowed to pass through components of the membrane container successively from the center toward to outside of the membrane container. As a result, the casing of the membrane container can be more simplified.

In addition, according to an aspect of the present invention, in the membrane container used in the dehydrator of the present invention, an aggregate cross section of the most upstream portion in a direction perpendicular to the flow direction of the treated fluid, an aggregate of the cross section of the most downstream portion, and an aggregate of the cross section of a portion of the intermediate portion of the flow path, in which the treated fluid flows in the same direction and which is located n-th (n is an integer of 1 or greater) from the most upstream portion, are set the same as one another. Accordingly, the flow velocity of the treated fluid that flows through each portion of the flow path can be maintained in a specific range. With the above-described configuration, a sufficiently high water separation performance can be achieved in each portion of each of the plurality of flow paths because the water separation performances of the portions of the plurality of flow paths are not different from one another.

BRIEF DESCRIPTION OF DRAWINGS

FIG. 3A is a cross sectional view of the membrane container body and FIG. 3B is a longitudinal section (section along the longitudinal direction) of the membrane container body.

FIGS. 5A and 5B are plan views of the membrane container according to an exemplary embodiment of the present invention. More specifically, FIG. 5A is a plan view of the membrane container viewed from above and FIG. 5B is a plan view of the membrane container viewed from below.

FIG. 6 is a diagram illustrating a ratio of the quantity of permeation of water to the quantity of permeation of a matter (containing water and ethanol) that has permeated through water separation membranes.

DESCRIPTION OF EMBODIMENTS

Figure 1:
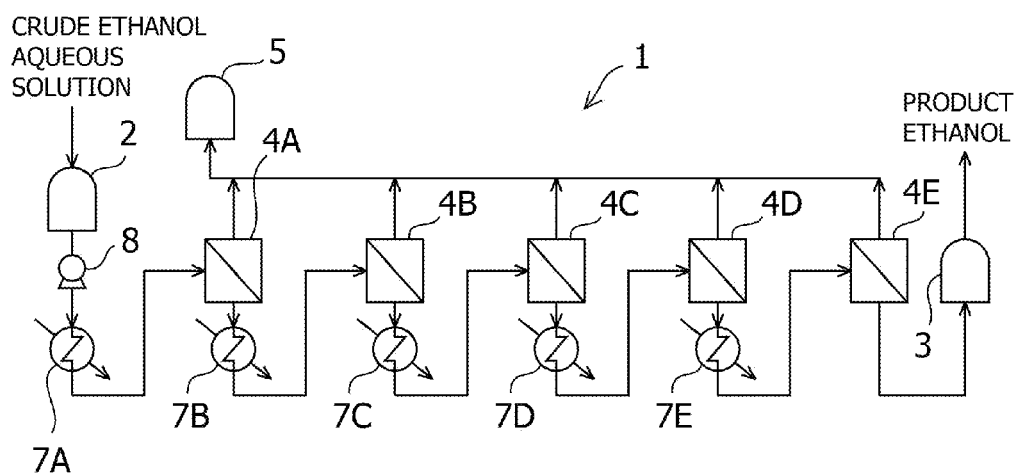
FIG. 1 is a schematic diagram illustrating the entire dehydrator according to an exemplary embodiment of the present invention.

Now, a dehydrator according to an exemplary embodiment of the present invention will be described below with reference to the attached drawings. FIG. 1 is a schematic diagram illustrating the entire dehydrator according to an exemplary embodiment of the present invention.

The dehydrator 1 according to the present exemplary embodiment is configured to dehydrate a crude ethanol aqueous solution used as treated fluid. The inventors assume approximately 91 wt % of the concentration of ethanol for the concentration of the crude ethanol aqueous solution. The dehydrator 1 is configured to treat and purify crude ethanol containing ethanol as an organic component to finally produce product ethanol (absolute ethanol) whose ethanol concentration is in the range of 99.5 to 99.8 wt %.

Referring to FIG. 1, the dehydrator 1 is constituted by a first tank 2, to which treated fluid (a crude ethanol aqueous solution) is supplied, a second tank 3, into which the dehydrated product ethanol flows, a plurality of water separation membrane units 4A through 4E provided between the first tank 2 and the second tank 3, and a third tank 5, into which water separated from the treated fluid flows.

As illustrated in FIG. 1, the plurality of water separation membrane units 4A through 4E is connected in series. Each of the plurality of water separation membrane units 4A through 4E is provided with a membrane container 6 (see FIG. 2), which will be described below. Each water separation membrane units 4A through 4E is configured to separate water by the pervaporation method, in which the supply side is a liquid phase and the permeation side is a gas phase. In the present exemplary embodiment, for the membrane container 6 of the water separation membrane units 4A through 4E, a flow path for the treated fluid is referred to as the "supply side", and the outside of the membrane container 6 is referred to as the "permeation side". The treated fluid flows into the water separation membrane units 4A through 4E in a state in which the permeation side of the water separation membrane units 4A through 4E is decompressed by a decompressor (not illustrated). Accordingly, the water contained in the treated fluid becomes steam, and the steam is drawn out toward the permeation side. As illustrated in FIG. 1, the steam drawn out by each of the water separation membrane units 4A through 4E flows into the third tank 5.

As illustrated in FIG. 1, respective heat exchangers 7A through 7E and the water separation membrane units 4A through 4E are provided alternately to one another. It is generally known that when the pervaporation method is used, the velocity of water permeation decreases due to the temperature decrease of the treated fluid. Accordingly, the heat exchangers 7A through 7E are configured to heat the treated fluid that flows into the water separation membrane units 4A through 4E to prevent the temperature decrease of the treated fluid.

With the above-described configuration, in the dehydrator 1 according to the present exemplary embodiment, the treated fluid supplied to the first tank 2 is then fed from the pump 8 and is allowed to flow into the heat exchanger 7A, the water separation membrane unit 4A, the heat exchangers 7B, the water separation membrane unit 4B, the heat exchanger 7C, the water separation membrane unit 4C, the heat exchanger 7D, the water separation membrane unit 4D, the heat exchanger 7E, the water separation membrane unit 4E in this order. After passing through the most downstream water separation membrane unit 4E, the treated fluid flows into the second tank 3 and is then recovered as product ethanol. In addition, as illustrated in FIG. 1, the steam drawn out by each of the water separation membrane units 4A through 4E flows into the third tank 5.

Figure 2:
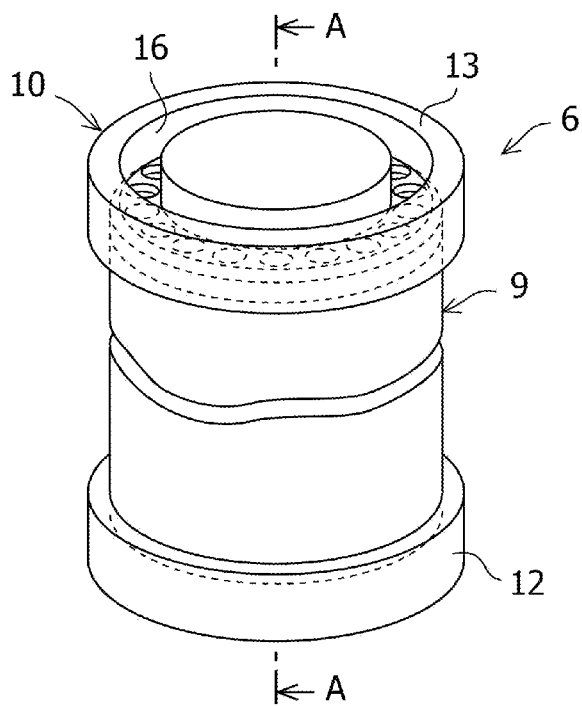
FIG. 2 is a perspective view of a membrane container according to an exemplary embodiment of the present invention.

FIG. 2 is a diagram which illustrates the membrane container 6 provided in each of the water separation membrane unit 4A through 4E according to the present exemplary embodiment. In the present exemplary embodiment, each of the water separation membrane units 4A through 4E (see FIG. 1) is provided with the membrane container 6. Referring to FIG. 2, the membrane container 6 has: a membrane container body 9; and a casing 10 which engages the membrane container body 9.

Figure 3A:
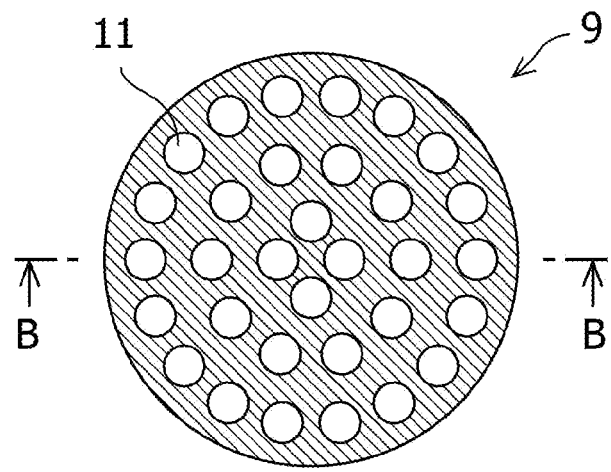
FIGS. 3A and 3B are diagrams illustrating a membrane container body of the membrane container according to an exemplary embodiment of the present invention. More specifically.
Figure 3B:
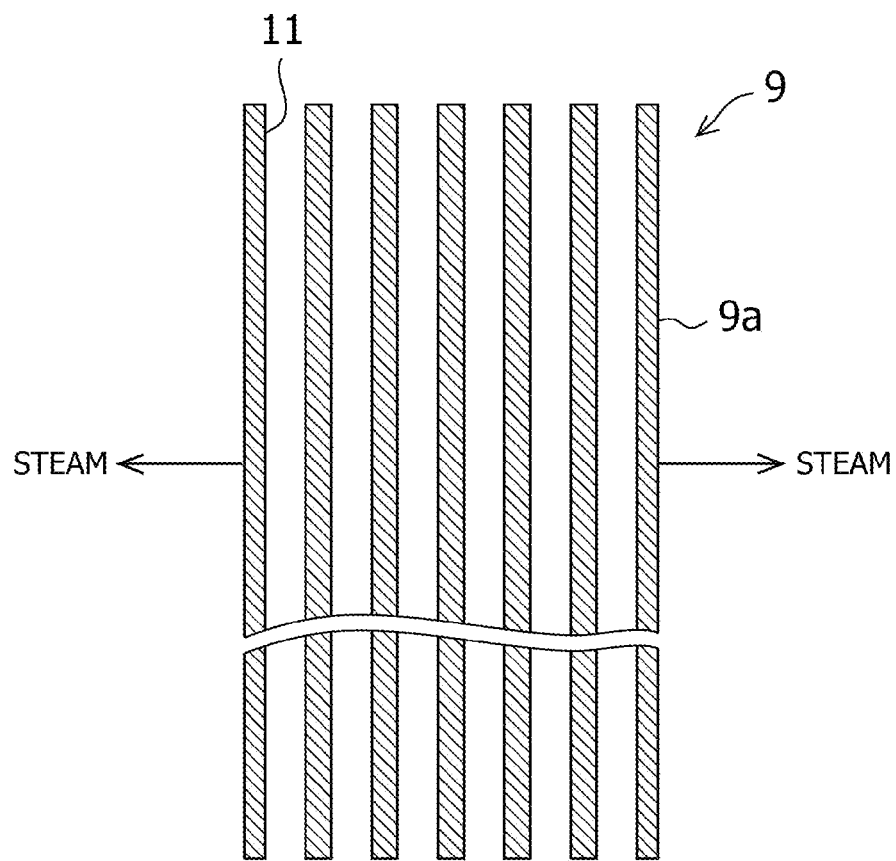

FIGS. 3A and 3B are diagrams which illustrate the membrane container body 9 of the membrane container 6 according to the present exemplary embodiment. More specifically, FIG. 3A is a cross sectional view of the membrane container body 9 and FIG. 3B is a longitudinal section (section along the longitudinal direction) of the membrane container body 9. The membrane container body 9 is constituted by a monolith-type water separation membrane and has a columnar shape. Referring to FIGS. 3A and 3B, the membrane container body 9 is provided with a plurality of flow paths 11, which is formed in parallel to one another along the longitudinal direction of the membrane container body 9. The membrane container body 9 is provided in each of the water separation membrane units 4A through 4E so that the direction of flow of the treated fluid becomes parallel to the direction of extension of the flow path 11.

As illustrated in FIGS. 3A and 3B, after flowing into the water separation membrane units 4A through 4E, the treated fluid flows through the flow path 11 of the membrane container body 9 (i.e., the supply side). Then, the water contained in the treated fluid becomes steam, and the steam is drawn out by the decompression operation executed by a decompressor (not illustrated).

Note that in FIGS. 3A and 3B, the membrane container body 9 is illustrated in outlines with the dimension of each hole indicating the flow path 11 being exaggerated for easier understanding. As the material of the membrane container body 9, an inorganic porous membrane in which holes on the order of nanometers or smaller are controlled precisely can be used. The porous membrane having fine holes achieves a molecule sieving effect of allowing small-molecule gases to pass through and exclude large-molecule gases, and exhibits a behavior of activation diffusion in which the permeation factor thereof increases with the increase in temperature. As an example of a porous membrane having fine holes, a carbon membrane, a silica membrane, and a zeolite membrane can be mentioned.

Also, the inorganic water separating membrane described in Japanese Patent No. 2808479 can also be applied. The inorganic water separating membrane described in Japanese Patent No. 2808479 is an acid-resistant composite separation membrane obtained by carrying silica gel obtained through hydrolysis of alkoxysilane containing an ethoxy group or methoxy group in the fine holes of an inorganic porous body. Note that, as a porous base member on which the inorganic water separation membrane is carried, a base member of a ceramic such as alumina, silica, zirconia, or titania is usually used, and a preferable base member is a tubular base member having a plurality of flow paths (inner tubes) which extends in the longitudinal direction and each of which have a circular cross-section. The inorganic water separation membrane is formed in a way to cover inner walls of such inner tubes.

Besides the inorganic water separation membrane, an organic membrane such as a polyvinyl alcohol membrane, a polyimide membrane or a polyamide membrane can be used as the water separation membrane.

Note that for the membrane container body 9, a membrane container body having a diameter of 180 mm, a length in the longitudinal direction of 1,000 mm, and a columnar shape, for example, can be used. In this example, 2,000 flow paths each having a diameter of 3 mm are provided in the longitudinal direction of the membrane container body 9. Note that the material and the size of the membrane container body 9 and the diameter, the quantity, and the like of the flow paths can be selected by a person having ordinary skill in the art according to their purpose of use.

Figure 4:
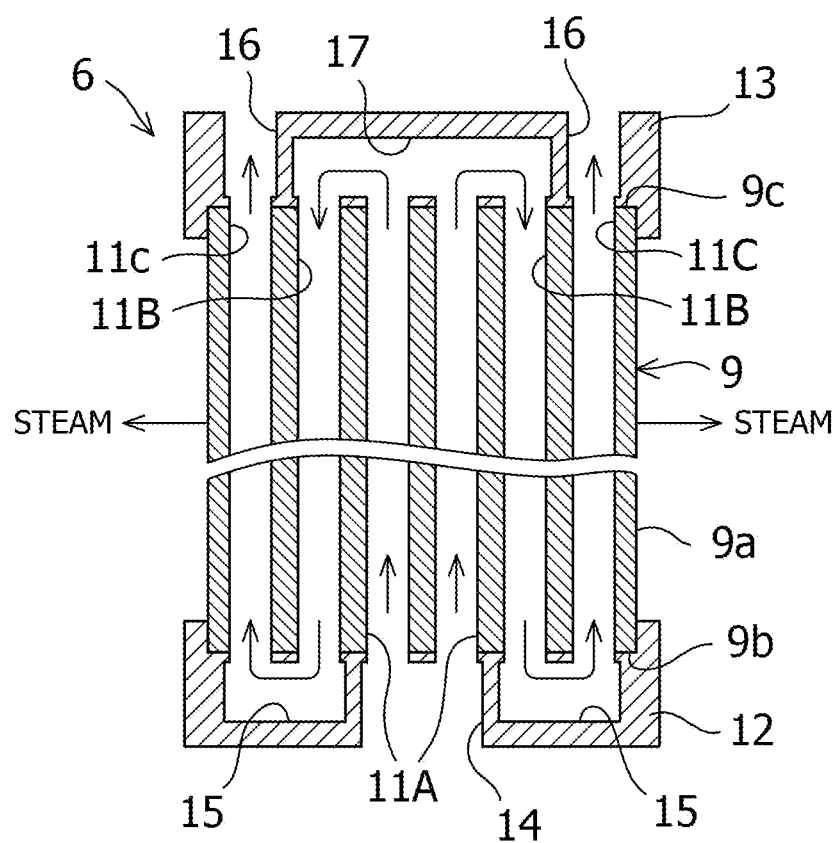
FIG. 4 is a cross section of FIG. 2 taken along the line A-A.
Figure 7B:
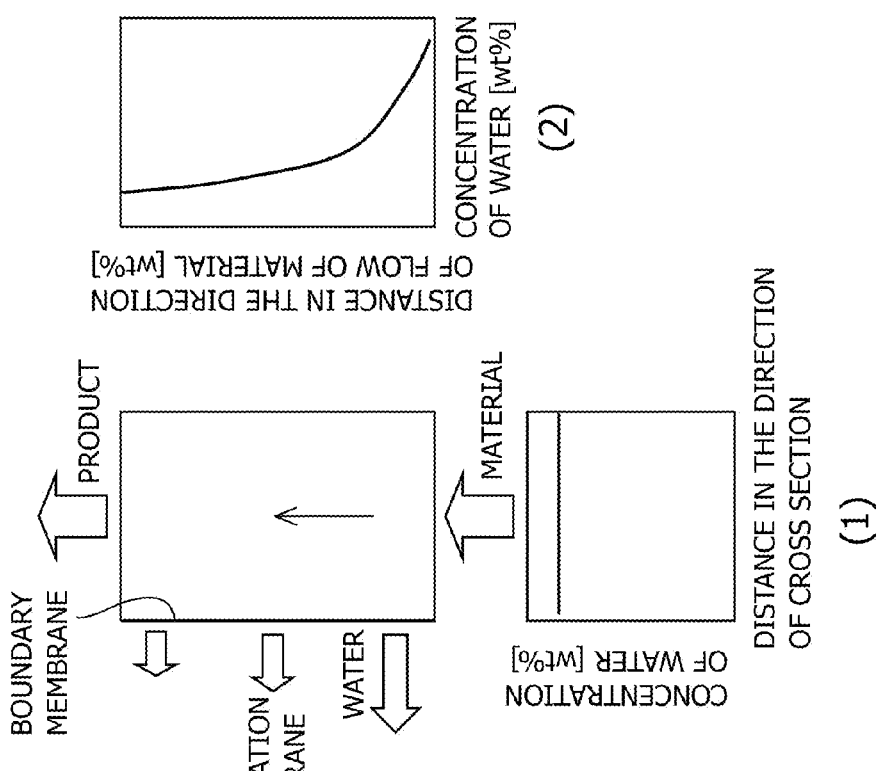
FIG. 7B is a diagram illustrating a case in which the concentration polarization has not occurred because the flow velocity of the treated fluid is high.
Figure 7A:
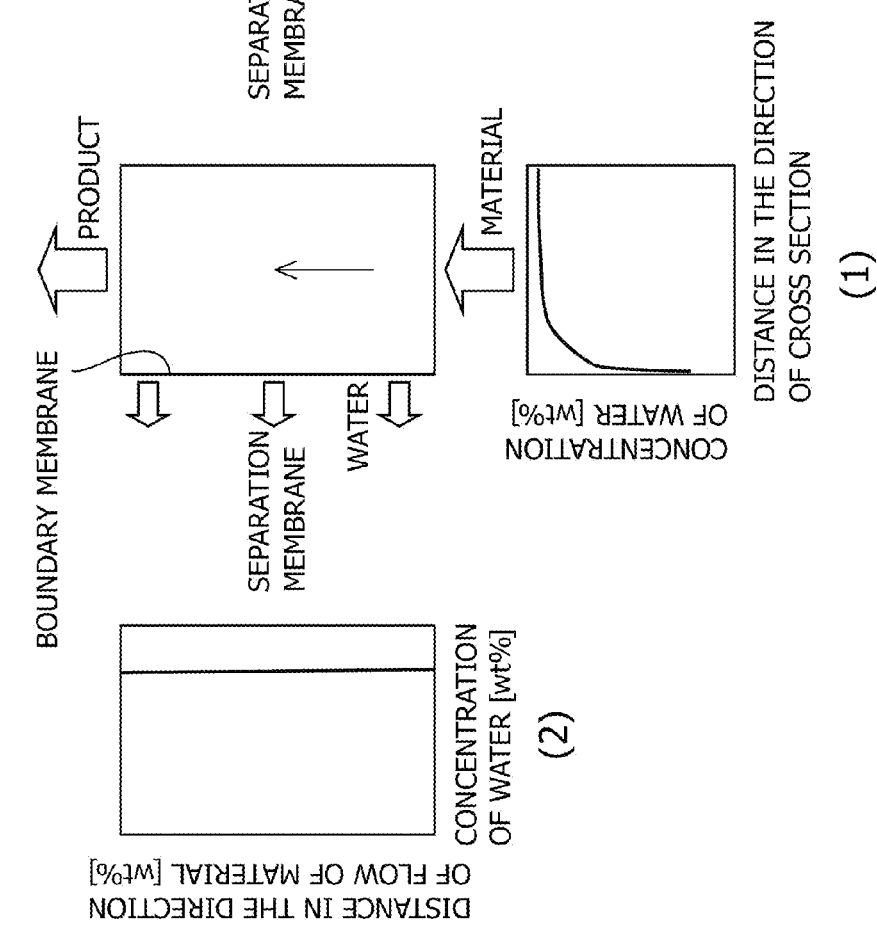
FIG. 7A is a diagram illustrating a case in which concentration polarization has occurred because the velocity of flow of treated fluid is low.

Now, characteristics of the membrane container 6 according to the present exemplary embodiment will be described in detail below. FIG. 4 is a cross section of FIG. 2 taken along the line A-A. FIGS. 5A and 5B are plan views of the membrane container 6. More specifically, FIG. 5A is a plan view of the membrane container 6 viewed from above and FIG. 5B is a plan view of the membrane container 6 viewed from below.

Referring to FIG. 4, the plurality of flow paths 11 of the membrane container body 9 according to the present exemplary embodiment is constituted by a most upstream portion 11A which is located the most upstream, an intermediate portion 11B which is located the second most upstream, and a most downstream portion 11C which is located the most downstream. The most upstream portion 11A is arranged around the center axis (the radial center) of the membrane container body 9. The intermediate portion 11B is arranged in a radial outer periphery with respect to the most upstream portion 11A. In addition, the most downstream portion 11C is arranged in a radial outer periphery with respect to the intermediate portion 11B.

As illustrated in FIGS. 3A, 3B, 4, 5A, and 5B, the casing 10 of the membrane container 6 has: a lower shell part 12 which is arranged on a lower end 9b of the membrane container body 9; and an upper shell part 13 which is arranged on an upper end 9c of the membrane container body 9.

As illustrated in FIGS. 4, 5A, and 5B, a round fluid inlet 14, through which the treated fluid flows, is provided in the substantially radial center of the lower shell part 12. The fluid inlet 14 of the lower shell part 12 is connected to the most upstream portion 11A of the flow path 11. In addition, in the periphery of the fluid inlet 14 of the lower shell part 12, a lower return portion 15 for connecting between the intermediate portion 11B and the most downstream portion 11C of the flow path 11 is provided. The lower return portion 15 is formed by forming a recess on the contact surface between the lower shell part 12 and the membrane container body 9. The lower return portion 15 is configured to reverse the direction of flow of the treated fluid that flows through the intermediate portion 11B to allow the treated fluid to flow into the most downstream portion 11C.

As illustrated in FIGS. 4, 5A, and 5B, the upper shell part 13 is provided with a fluid outlet 16, which is formed along the circumferential direction of the upper end 9c of the membrane container body 9. The fluid outlet 16 is connected to the most downstream portion 11C of the flow path 11. In addition, in the substantially radial center of the upper shell part 13, an upper return portion 17 for connecting between the most upstream portion 11A and the intermediate portion 11B of the flow path 11 is provided. The upper return portion 17 is formed by forming a recess on the contact surface between the upper shell part 13 and the membrane container body 9. The upper return portion 17 is configured to reverse the direction of flow of the treated fluid that has flowed from the most upstream portion 11A to allow the treated fluid to flow into the intermediate portion 11B.

With the above-described configuration, in the membrane container 6 according to the present exemplary embodiment, after flowing in through the fluid inlet 14 of the lower shell part 12, the treated fluid flows into the most upstream portion 11A of the flow path 11, the upper return portion 17, the intermediate portion 11B of the flow path 11, the lower return portion 15, the most downstream portion 11C of the flow path 11, and the fluid outlet 16 of the upper shell part 13 successively in this order. During the operation described above, water contained in the treated fluid becomes steam, and the steam is drawn out by a decompression operation carried out by the decompressor from a side surface 9a of the membrane container body 9 to the outside of the membrane container body 9.

Note that in the present exemplary embodiment, it is more useful if the flow velocity of the treated fluid that flows through the most upstream portion 11A, the intermediate portion 11B, and the most downstream portion 11C is set within a specific range. More specifically, for example, this flow velocity can be set so that the aggregate radial cross section (the term "radial" herein refers to a direction perpendicular to the flow direction of the treated fluid) of the most upstream portion 11A, the aggregate radial cross section of the intermediate portion 11B, and the aggregate radial cross section of the most downstream portion 11C become the same as one another. For example, if all the flow paths 11 have the same diameter, the same quantity of the flow paths 11 can be assigned to each of the most upstream portion 11A, the intermediate portion 11B, and the most downstream portion 11C. With the above-described configuration, the most upstream portion 11A, the intermediate portion 11B, and the most downstream portion 11C can have substantially the same aggregate radial cross section. Furthermore, with the above-described configuration, it is enabled to maintain the flow velocity of the treated fluid that flows through the most upstream portion 11A, the intermediate portion 11B, and the most downstream portion 11C within a specific range.

According to the present exemplary embodiment, the membrane container 6 of the dehydrator 1 is provided with the fluid inlet 14 through which the treated fluid flows, the casing 10 having the fluid outlet 16 from which the treated fluid flows out, and the membrane container body 9 having the plurality of flow paths 11 provided along the flow direction of the treated fluid and in parallel to one another. The plurality of flow paths 11 is constituted by the most upstream portion 11A, which is located at the most upstream location, the intermediate portion 11B, which is located at the second most upstream location, and the most downstream portion 11C, which is located at the most downstream location. The upper return portion 17 configured to reverse the flow direction of the treated fluid is provided between the most upstream portion 11A and omitted portion 11B, and the lower return portion 15 configured to reverse the flow direction of the treated fluid is provided between the intermediate portion 11B and the most downstream portion 11C. With this configuration, after flowing in through the fluid inlet 14, the treated fluid successively passes through the most upstream portion 11A and the intermediate portion 11B and flows into the most downstream portion 11C. For example, when a 200,000 t/year-ethanol treatment is considered and if the conventional water separation membrane discussed by Patent Literature 1 is used for this treatment, the treated fluid simultaneously flows through all flow paths of the membrane container body. Accordingly, the cross section of the flow path (i.e., the cross section in the direction perpendicular to the flow direction of the treated fluid) is large in relation to the flow rate of the treated fluid. As a result, a sufficiently high flow velocity cannot be achieved. On the contrary, according to the membrane container 6 of the dehydrator 1 of the present exemplary embodiment, the cross section of the flow path is small in relation to the flow rate of the treated fluid. Accordingly, a high flow velocity of the treated fluid that flows in the membrane container body 9 can be achieved if a pump similar to that used in the conventional configuration is used. As a result, no concentration polarization may occur in the membrane container body 9. Accordingly, the present exemplary embodiment can secure a sufficiently high water separation performance.

In addition, in carrying out a treatment of 200,000 t/year-ethanol or less by using the conventional technique, a problem may arise such that the dehydrator 1 cannot be scaled down due to the degraded water separation performance. On the contrary, according to the membrane container 6 of the dehydrator 1 of the present exemplary embodiment, the treated fluid can flow in the membrane container body 9 at a sufficiently high flow velocity. Accordingly, the dehydrator 1 can be readily scaled down without degrading the water separation performance.

Note that in the present exemplary embodiment, it is useful if the flow velocity of the treated fluid that flows in the membrane container 6 is set at 0.4 m/s or higher. If the flow velocity is set at 0.4 m/s or higher, it is highly likely that concentration polarization can be prevented because the flow of the treated fluid becomes a turbulent flow. In addition, in order to further improve the water separation performance, it is more useful if the flow velocity of the treated fluid is set at 1.0 m/s.

Moreover, in the membrane container 6 of the dehydrator 1 according to the present exemplary embodiment, the most upstream portion 11A is arranged in the periphery of the center axis (the radial center) of the membrane container body 9, the intermediate portion 11B is arranged in the radial outer periphery in relation to the most upstream portion 11A, and the most downstream portion 11C is arranged in the radial outer periphery in relation to the intermediate portion 11B. In other words, the membrane container 6 has a configuration with which the treated fluid successively flows in the membrane container body 9 and passes through the components of the membrane container body 9 from the center toward the outside thereof. Accordingly, the configuration of the casing 10 of the membrane container 6 can be more simplified.

In addition, according to the membrane container 6 of the dehydrator 1, the aggregate cross sections of the portions of the plurality of flow paths 11 are set so that the aggregate radial cross section (i.e., the cross section in the direction perpendicular to the flow direction of the treated fluid) of the most upstream portion 11A, the aggregate radial cross section of the intermediate portion 11B, and the aggregate radial cross section of the most downstream portion 11C become the same as one another. Accordingly, the flow velocity of the treated fluid in the portions 11A through 11C of the plurality of flow paths 11 becomes constant. As a result, a sufficiently high water separation performance can be achieved in each portion of each of the plurality of flow paths 11 because the water separation performances of the portions 11A through 11C of the plurality of flow paths 11 are not different from one another.

Exemplary embodiments of the present invention are described above. However, the present invention is not limited to the exemplary embodiments described above and can be implemented by various modifications and alterations based on the technical idea of the present invention.

In the present exemplary embodiment, the most upstream portion 11A, the intermediate portion 11B, and the most downstream portion 11C are arranged so that the treated fluid flows in the membrane container 6 and successively passes through the portions from the center toward the outside. However, the configuration of the present invention is not limited to this. For example, the most upstream portion 11A, the intermediate portion 11B, and the most downstream portion 11C can be arranged so that the treated fluid successively passes through the portions radially from the outside of the membrane container body 9 toward the center thereof.

In the present exemplary embodiment, the plurality of flow paths 11 is constituted by three portions, i.e., the most upstream portion 11A, the intermediate portion 11B, and the most downstream portion 11C. However, the configuration of the flow path 11 is not limited to this. For example, the flow path 11 can be configured so that the flow direction of the treated fluid is reversed at least once in the membrane container body 9. In addition, alternatively, the plurality of flow paths 11 can be constituted by two portions including the most upstream portion 11A and the most downstream portion 11C.

Further alternatively, the flow path 11 can be configured so that the flow direction of the treated fluid is reversed for a plurality of times in the intermediate portion 11B. For example, the intermediate portion 11B of the flow path 11 can be further divided into three sub portions. In this case, the intermediate portion 11B includes: a first sub portion in which the treated fluid flows downwards after returning from the most upstream portion 11A; a second sub portion in which the treated fluid flows upwards after returning from the first sub portion; and a third sub portion in which the treated fluid flows downwards after returning from the second sub portion. In this configuration, the first sub portion of the intermediate portion 11B is a portion located the most upstream from the most upstream portion 11A, the second sub portion thereof is a portion located the second most upstream from the most upstream portion 11A, and the third sub portion thereof is a portion located the third most upstream from the most upstream portion 11A. In the configuration described above, in order to achieve a constant flow velocity of the treated fluid in each portion of the flow path 11, the aggregate cross sections can be set so that the aggregate radial cross section of the most upstream portion 11A, the aggregate radial cross section of the first sub portion of the intermediate portion 11B, the aggregate radial cross section of the second sub portion of the intermediate portion 11B, the aggregate radial cross section of the third sub portion of the intermediate portion 11B, and the aggregate radial cross section of the most downstream portion 11C become the same as one another.

In the present exemplary embodiment, treated fluid that contains ethanol as its organic component is used as the target of the dehydration. However, the present invention, which uses the membrane container 6 described above, is not limited to this and can be applied if the treated fluid is an organic aqueous solution. For example, the organic component contained in the organic water solution can be an organic component selected from the group consisting of alcohol such as ethanol, propanol, isopropanol, glycol; carboxylic acid such as acetic acid; ether such as dimethyl ether, diethyl ether; aldehyde, such as acetaldehyde; ketone such as acetone, methyl ethyl ketone; and ester such as ethyl acetate ester.

REFERENCE SIGNS LIST

1: Dehydrator
2: First tank
3: Second tank
4A, 4B, 4C, 4D, 4E: Water separation membrane unit
5: Third tank
6: Membrane container
7A, 7B, 7C, 7D, 7E: Heat exchanger
8: Pump
9: Membrane container body
10: Casing
11: Flow path
11A: Most upstream portion of the flow path
11B: Intermediate portion of the flow path
11C: Most downstream portion of the flow path
12: Lower shell part of the casing
13: Upper shell part of the casing
14: Fluid inlet
15: Lower return portion
16: Fluid outlet
17: Upper return portion

The invention claimed is:

1. A membrane container comprising:
a casing that comprises:
 a fluid inlet through which treated fluid flows in; and
 a fluid outlet from which the treated fluid flows out; and
a membrane container body including a plurality of flow paths arranged along a flow direction of the treated fluid and in parallel to one another,
wherein the membrane container body has a shape of a cylinder;
wherein water is separated from the treated fluid while the treated fluid passes through the plurality of flow paths;
wherein the plurality of flow paths comprises:
 a most upstream portion connected to the fluid inlet; and
 a most downstream portion connected to the fluid outlet,
wherein each of the most upstream portion and the most downstream portion includes a plurality of flow paths;
wherein each of the flow paths constituting the most upstream portion extends in an axial direction of the cylinder, and is arranged in a spaced manner around a center axis of the cylinder;
wherein each of the flow paths constituting the most downstream portion extends in an axial direction of the cylinder, and is arranged in a spaced manner radially outward of the most upstream portion;
wherein a passage-folding portion for reversing the flow direction of the treated fluid is provided between the most upstream portion and the most downstream portion;
wherein the treated fluid, after passing through the fluid inlet, is allowed to flow to the most upstream portion constituted by the respective flow paths, to merge at the passage-folding portion, and to flow down to the most downstream portion also constituted by the respective flow paths
wherein an intermediate portion in which the flow direction of the treated fluid is reversed by the passage-folding portion at least once is provided between the most upstream portion and the most downstream portion of the plurality of flow paths, and
wherein the treated fluid, after passing through the fluid inlet, is allowed to flow from the most upstream portion to the most downstream portion via the intermediate portion by successively passing through the most upstream portion, the intermediate portion, and the most downstream portion in this order.

2. The membrane container according to claim 1, wherein the intermediate portion is arranged in an outer periphery of the most upstream portion, and
wherein the most downstream portion is arranged in an outer periphery of the intermediate portion.

3. The membrane container according to claim 1, wherein an aggregate cross section of the most upstream portion in a direction perpendicular to the flow direction of the treated fluid,
an aggregate cross section of the most downstream portion as viewed in a direction perpendicular to the flow direction of the treated fluid, and
an aggregate cross section of the intermediate portion as viewed in a direction perpendicular to the flow direction of the treated fluid,
are set to be the same.

4. The membrane container according to claim 2, wherein an aggregate cross section of the most upstream portion in a direction perpendicular to the flow direction of the treated fluid,
an aggregate cross section of the most downstream portion as viewed in a direction perpendicular to the flow direction of the treated fluid, and
an aggregate cross section of the intermediate portion as viewed in a direction perpendicular to the flow direction of the treated fluid,
are set to be the same.

* * * * *